No. 714,926. Patented Dec. 2, 1902.
W. F. MacGREGOR.
STEERING MECHANISM FOR TRAIL VEHICLES.
(Application filed Mar. 8, 1902.)
(No Model.)
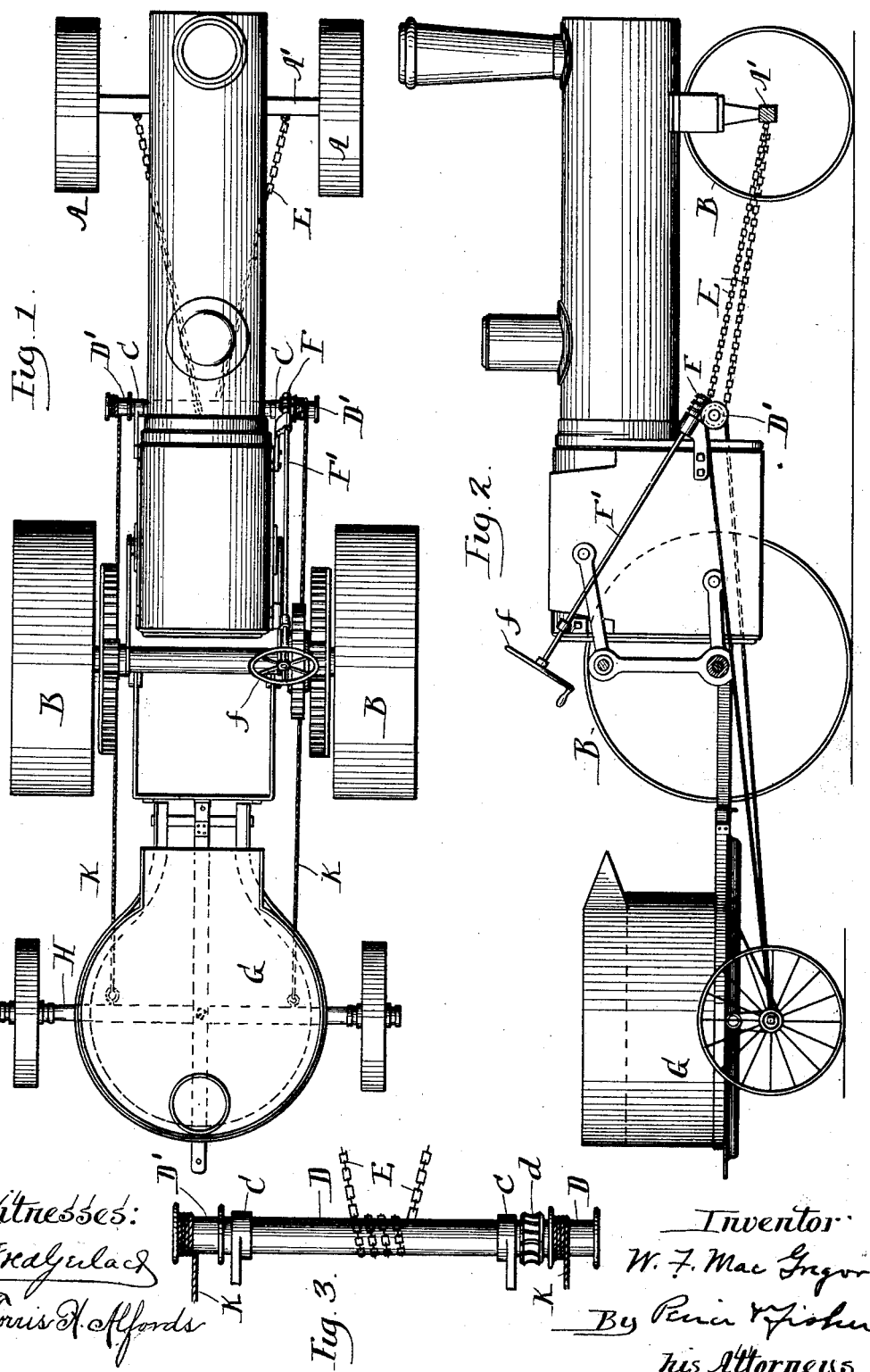

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION OF WISCONSIN.

STEERING MECHANISM FOR TRAIL-VEHICLES.

SPECIFICATION forming part of Letters Patent No. 714,926, dated December 2, 1902.

Application filed March 8, 1902. Serial No. 97,290. (No model.)

*To all whom it may concern:*

Be it known that I, WALLACE F. MACGREGOR, a citizen of the United States, and a resident of the city and county of Racine, State of Wisconsin, have invented certain new and useful Improvements in Steering Mechanism for Trail-Vehicles, of which the following is a full, clear, and exact description, reference being had to the accompanying drawings, forming a part of this specification.

The object of this invention is to provide improved means whereby the trail-vehicle of a portable engine may be more readily and effectively steered, so that such vehicle shall promptly respond to the movements of the engine or lead vehicle. Heretofore the common practice has been to steer the trail-vehicle by cables or equivalent connections leading from the swiveled steering-truck of the engine to the pivoted truck of the trail-vehicle.

The present invention consists in controlling the movements of the trail-vehicle wheels from the steering drum or windlass of the engine and without the employment of cables for connecting the vehicle-truck with the steering-truck of the engine.

In the accompanying drawings, Figure 1 is a plan view of a traction-engine and trail-vehicle having my invention applied thereto. Fig. 2 is a view in side elevation, parts being removed. Fig. 3 is an enlarged detail plan view of the steering drum or windlass.

The engine is mounted in the usual or in any suitable manner upon front and rear wheels A and B, the front wheels A being carried by the pivoted truck-axle A'. Transversely of the engine and mounted in suitable bearings C extends the steering drum or windlass D, around which passes the steering cable or chain E, the ends of which lead to the front steering-truck A', as clearly seen in Fig. 1 of the drawings. As shown, the steering drum or windlass D is provided with a worm-wheel *d*, with which gears a worm F, fixed to the end of the shaft F', the upper end of this shaft being provided with the usual hand-wheel *f* for manipulation by the operator. The shaft F' may be supported in the usual manner by brackets at the side of the engine-frame.

The trail-vehicle G is of the type set forth in an application, Serial No. 59,025, filed in the Patent Office May 6, 1901; but this vehicle may be of any desired type, its construction forming no part of the present invention. The trail-vehicle is attached to the rear of the engine and is provided with a pivoted truck H, from which lead the steering cables, chains, or equivalent connections K, as clearly shown in Fig. 1 of the drawings. In the simplest and preferred form of the invention the steering-cables K of the trail-vehicle truck lead to winding drums or surfaces D', formed upon the prolongated ends of the steering drum or windlass D, and by reference to Figs. 1 and 3 of the drawings it will be seen that the forward ends of the cables or connections K are reversely wound upon their respective drums D'.

From the foregoing description it will be seen that when the operator by turning the shaft F' imparts revolution to the steering drum or windlass D the steering-truck A', at the front of the engine, will be turned about its pivot-point, while at the same time the corresponding proper shift will be imparted to the truck of the trail-vehicle because of the winding of one cable K and the unwinding of the other cable K by means of the supplemental drums D'.

So far as I am aware, this invention presents the first instance of a trail-vehicle the wheels of which are controlled from the steering drum or windlass and without the necessity of cables or like connections between the steering-truck of the engine and the truck of the trail-vehicle, and it is manifest that the details above set forth may be varied widely by the skilled mechanic without departing from the spirit of the invention.

In certain styles of portable engines and tenders the steering-wheels are supported upon individual pivoted axles or trucks— such, for example, as are shown in Patent No. 594,866, granted to T. M. Fuller December 7, 1897. Obviously my invention is equally applicable to such constructions, and where the term "truck" is employed in the following claims I wish it to be understood as including such individual axles or trucks as the equivalent of the construction herein shown, in which both steering-wheels of the trail-vehicle (or of the engine) are mounted upon a single truck or axle.

Having thus described my invention, what I claim as new, and desire to secure by Letters Patent, is—

1. The combination with the steering-truck of a portable engine and with the steering-truck of a trail-vehicle, of a steering drum or windlass and means for turning the same, connections leading from said steering drum or windlass to the steering-truck of the engine and connections leading from said steering drum or windlass to the truck of the trail-vehicle.

2. The combination with the steering-truck of an engine and with the truck of a trail-vehicle, of means for shifting said trucks comprising a steering-drum provided at its ends with supplemental winding-surfaces, cables or connections leading from said steering-drum to the steering-truck of the engine and cables or connections leading from said supplemental winding-surfaces rearwardly to the truck of the trail-vehicle.

WALLACE F. MACGREGOR.

Witnesses:
ORSON Z. OLIN, Jr.,
FREDERICK LEE NORTON.